Sept. 2, 1958

P. E. MILLER 2,849,823

MOTOR OPERATED FOWL DECOY

Filed May 8, 1956

4 Sheets-Sheet 1

INVENTOR
PAUL E. MILLER

BY *David L. Farley, Jr.*

ATTORNEY

Sept. 2, 1958 P. E. MILLER 2,849,823
MOTOR OPERATED FOWL DECOY
Filed May 8, 1956 4 Sheets-Sheet 2

INVENTOR
PAUL E. MILLER
BY *David L. Farley, Jr.*
ATTORNEY

Sept. 2, 1958  P. E. MILLER  2,849,823
MOTOR OPERATED FOWL DECOY

Filed May 8, 1956  4 Sheets-Sheet 3

INVENTOR
PAUL E. MILLER
BY David L. Farley Jr.
ATTORNEY

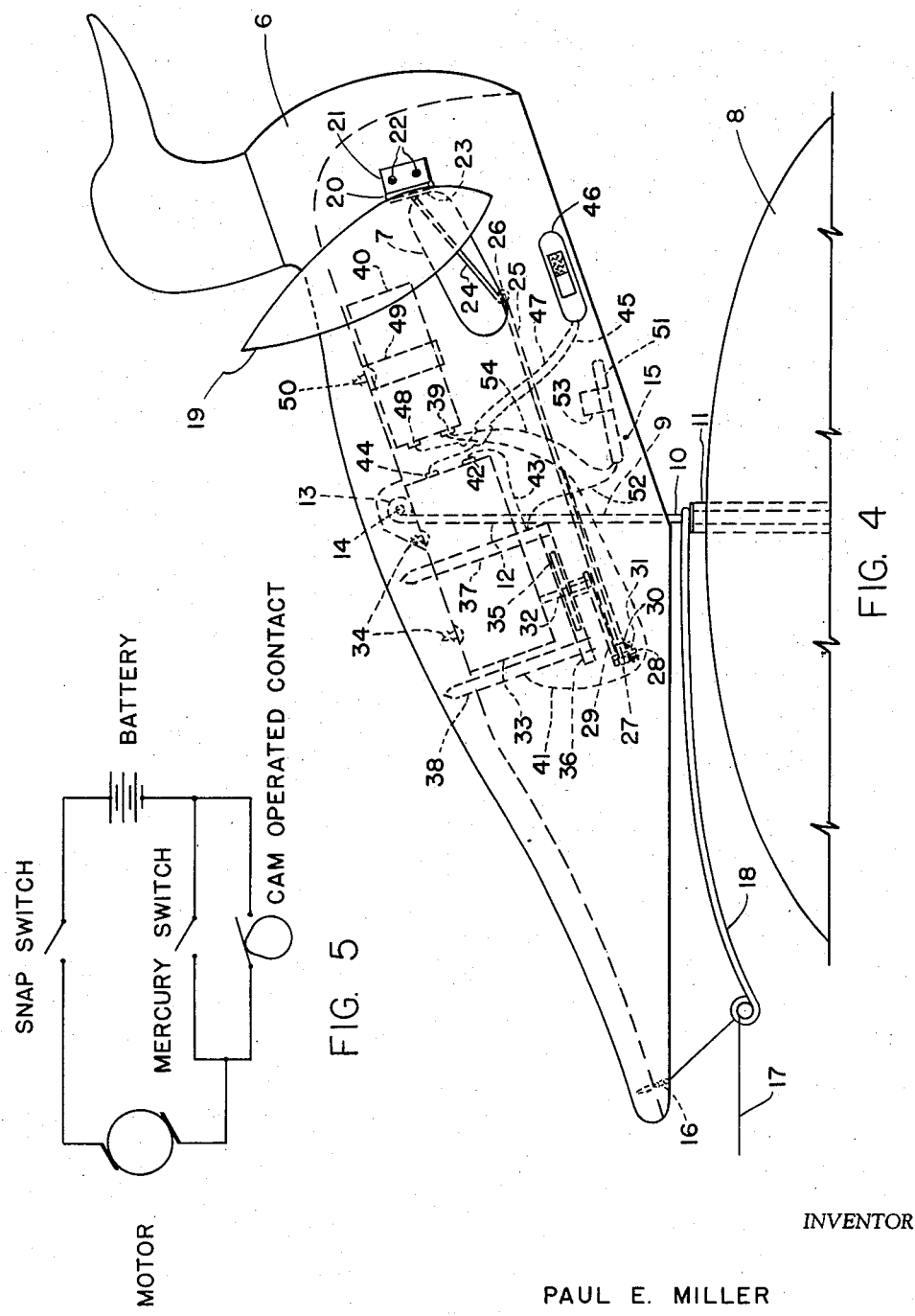

United States Patent Office 2,849,823
Patented Sept. 2, 1958

2,849,823
MOTOR OPERATED FOWL DECOY
Paul E. Miller, Richmond, Va.
Application May 8, 1956, Serial No. 583,585
5 Claims. (Cl. 43—3)

This invention relates to an improved form of motor operated fowl decoy adapted to assume partially erect position and flap its wing members when the body of the decay is tilted back. Essentially, the invention comprises a combination of a position actuated switch controlling a motor which is in driving connection with a pair of wing members pivotally attached to a decoy body. The switch is open when the decoy body is in a substantially horizontal position, but closes when the decoy body is tilted, thus actuating the motor which flaps the wing members.

Advantageously, but not necessarily, a secondary switch is provided which closes and actuates said motor only when the wing members are in a raised position. The secondary switch is open whenever the wing members are in rest position against the sides of the decoy.

The motor and other driving mechanism can be mounted either inside the hollow decoy body or on a float or on a stationary stand.

A primary object of this invention is to provide a motor driven decoy which simulates the natural motions of wild fowl shaking the water off of or stretching their wings.

A further object of this invention is to provide a motor driven decoy of simple and sturdy construction that is easy to operate.

Figure 1:
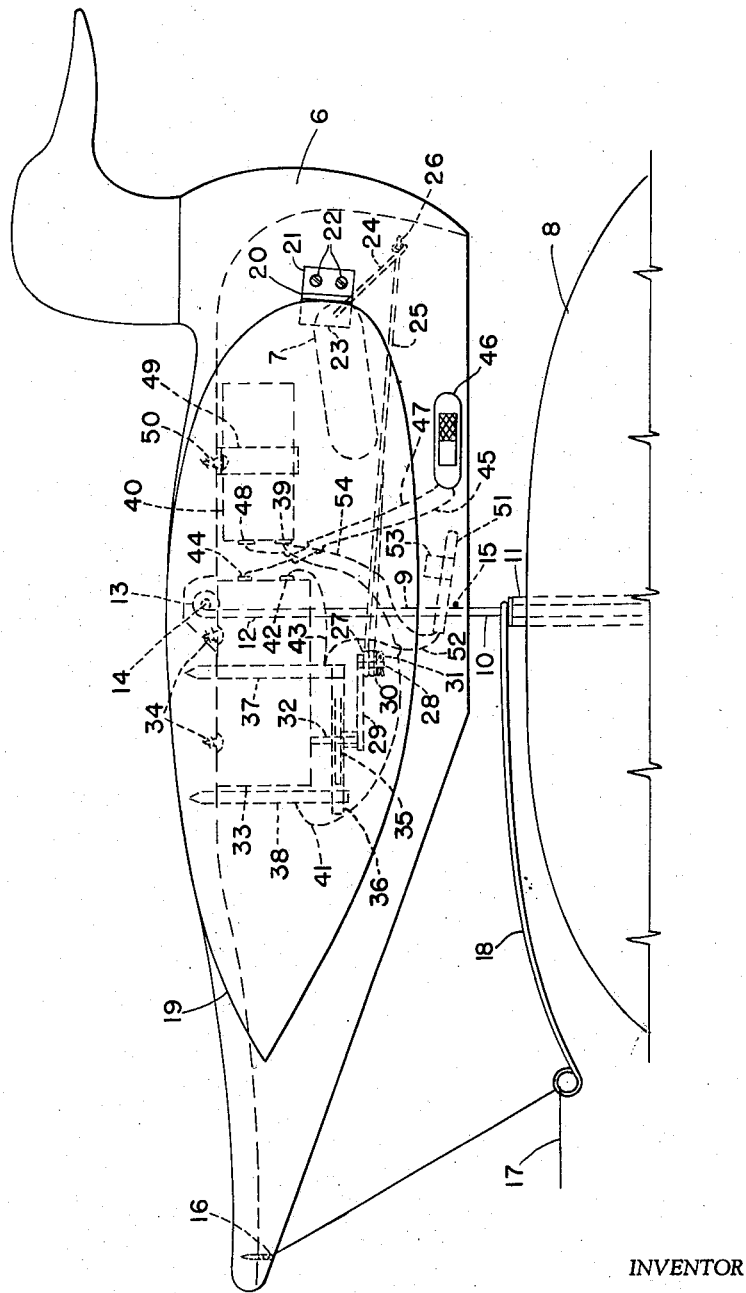
Figure 2:
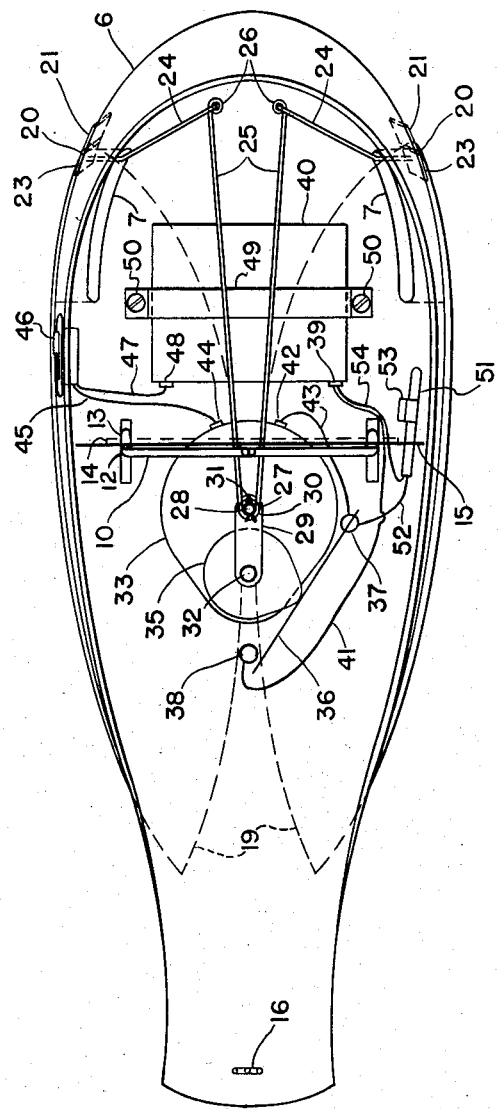
Figure 3:
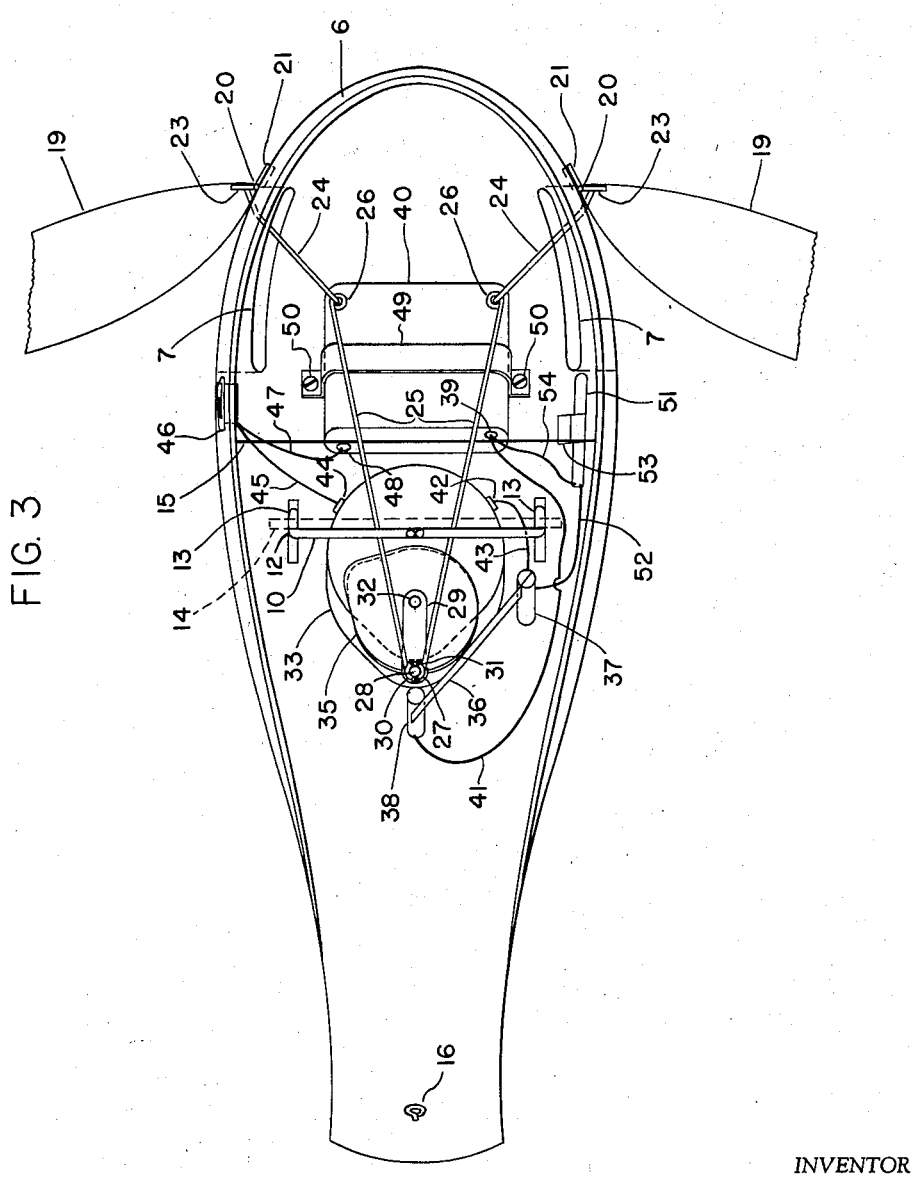

An advantageous embodiment of this invention is described below, by way of example, with reference to the accompanying drawings, in which:

Fig. 1 is a side elevation view of a decoy constructed according to this invention, and shown in a substantially horizontal position with its wing members resting against its body; and Fig. 2 is a plan view of the mechanism of the decoy of Fig. 1, looking from the bottom of the decoy up into its hollow interior, shown in a substantially horizontal position with its wing members resting against its body; and Fig. 3 is a plan view corresponding to Fig. 2 with the decoy of Fig. 1 shown in a partially erect position with its wing members raised; and Fig. 4 is a side elevation view of the decoy of Fig. 1 shown in a partially erect position with its wing members raised; and Fig. 5 is a diagram of the electrical circuits used in the decoy of Fig. 1.

In the drawings the body 6 of the decoy is hollow, is open at its bottom and has an opening 7 in each side. The body 6 is tiltably mounted on a support such as a water buoyant float 8 (or stationary stand) by means of a yoke 9 which has its base 10 loosely inserted in a pipe 11 which is fitted vertically in the float 8. The lower portion of the pipe 11 extends down below the float and acts as a keel. The yoke 9, which can be made from heavy wire, has two upright arms 12 extending up therefrom into the interior of the hollow decoy body 6. The upright arms 12 are spaced apart from one another to allow a motor and other driving mechanism of the decoy to be mounted therebetween inside the decoy body. Each of the two upright arms 12 of the yoke 9 has an eye 13 in its upper end at corresponding points. Both ends of a support rod 14 are fitted at corresponding points in the interior wall of the decoy body 6. The rod 14 extends in loose fit through the eyes 13.

The decoy body 6 naturally tends to return to a substantially horizontal position since the corresponding points, at which the opposite ends of the support rod 14 are attached, are on a pivot axis which is above and slightly behind the center of gravity of the decoy structure. A rubber band stop 15 is attached to and extends between corresponding points on the interior wall of the decoy body 6 on a line just forward of and below the position of the pivot axis. This stop 15 arrests the decoy body 6 in a substantially horizontal position since it bears against the base 10 of the yoke 9 when the decoy returns from a tilted position.

A screw eye 16 is screwed into the bottom surface of the tail of the decoy body 6. A pull means 17, of fine wire or cord, is attached at one end to the screw eye 16 and then extends down through an eye at the rear end of a yoke guide rod 18. The pull means 17 then extends back to the hunter's blind or other place of concealment. When the hunter pulls on the pull means 17, the decoy body 6 tilts about the support rod 14 and assumes a semi-upright or partially erect position. When the tension upon the pull means 17 is released by the hunter, the decoy returns by force of gravity to a substantially horizontal rest position.

A pair of wing members 19 are pivotally connected to opposite sides of the decoy body 6 in corresponding positions by a pair of hinges 20. The body 6 and the float 8 and the wing members 19 may be made in whole or in part from materials such as wood, electrically insulated metal, such as plastic coated metal, or plastic. Each hinge has its forward leaf 21 rigidly fastened by screws 22 to the exterior forward portion of the decoy body 6 at a point somewhat below the neck of the body and on or near the edge of the opening 7. The rearward movable leaf 23 of each one of the corresponding two hinges 20 is fastened to the interior surface of one of the two wing members 19 adjacent to its forward edge. Thus, the wing members 19 may be pivoted about the axes of the hinges 20.

Each rearward leaf 23 has a lever arm 24 attached to it. Such lever arm can also be attached to the inner surface of each wing member 19. Each lever arm 24 extends through the adjacent opening 7 and into the hollow interior of the decoy body 6 substantially perpendicularly to the plane of the wing member 19 or, advantageously, but not necessarily, forward into the hollow interior of the decoy body toward the head end of the body, as long as the wing members 19 are disposed in rest position along respective sides of the body.

One end of each of a pair of connecting rods 25 rotatably engages the end which extends into the decoy body of each of the lever arms 24. An eye 26 is formed in each such end of the connecting rods 25 and encloses the end of each lever arm 24, the lever arm's end portion being bent, to form a movable joint. The opposite end of each of the connecting rods 25 is formed into an eye 27 which encloses a crank pin 28 fitted in a crank arm 29 near one end thereof. Each eye 27 of the connecting rods 25 is held in loose and rotatable engagement with the crank pin 28 by a washer 30 and a cotter pin 31, with the eyes 27 positioned between the washer 30 and the upper surface of the crank arm 29. Such connecting rods 25 and crank arm 29 comprise the reciprocating means to drive the wing members 19.

The opposite end of the crank arm 29 is rigidly attached to the projecting drive shaft 32 of an electrical motor 33. Such motor 33 is mounted inside the hollow decoy body 6 by screws 34 which are screwed into the decoy body. The motor 33 is equipped inside its housing with speed reducing gears of the usual type well known to the art, which are connected to the drive shaft 32 of the motor 33. These gears are in such ratio as to cause the projecting drive shaft 32 to rotate at the same number of revolutions per minute as it is desired to have the wing members 19 of the decoy open and close; i. e., flapped by raising and lowering.

An eccentric disc or cam 35 is rigidly attached to and rotates with the drive shaft 32 of the motor 33, so that the projecting, off-center portion of the cam 35 strikes an electrically conductive spring 36 once for each revolution of the drive shaft 32 of motor 33. The spring 36 is attached at one end to and held in position adjacent to the cam 35 by a rigid mounting post 37. The other end of the spring 36 rests firmly against a contact post 38 and is pushed away from and clear of such post whenever the cam 35 strikes the unanchored portion of the spring 36 which is adjacent thereto. One terminal 39 of a small battery 40, such as a dry cell, is electrically connected to the contact post 38; and, thus, to the spring 36, when the latter is resting against the post 38 by a wire 41. The mounting post 37 is electrically connected to one terminal 42 of the motor 33 by a wire 43. The other terminal 44 of the motor 33 is electrically connected by a wire 45 to a snap switch 46 which, in turn, is electrically connected by a wire 47 to the other terminal 48 of the battery 40. Thus, a secondary switch circuit is formed which, when the snap switch 46 is closed, will be electrically closed and cause the motor 33 to operate whenever the cam 35 is not in contact with and thus releases the spring 36 (hence allowing the spring 36 to remain in contact with the contact post 38). The cam 35 is so attached to the rotating drive shaft 32 that the secondary circuit is closed and the motor operates only when the wing members 19 are in an open or raised position away from the sides of the decoy.

While a battery mounted inside the decoy is an advantageous electric current source, the current may also be supplied from any usual electrical source (e. g. from a distance) by wires or by a battery located on the float or base stand.

The battery 40 is held in position inside the decoy body 6 by a metal band 49 which extends around the battery and is screwed at both its ends to the inner wall of the decoy body by screws 50.

One lead of a mercury switch 51 is electrically connected to the mounting post 37 by a wire 52, and, thus to the terminal 42 of the motor 33 through the wire 43. The other terminal 44 of the motor 33 is electrically connected through the wire 45 and the snap switch 46 and the wire 47 to the other terminal 48 of the battery 40. The other lead of the mercury switch 51 is electrically connected to the other terminal 39 of the battery 40 by a wire 54. The mercury switch 51 is of usual design and is fastened to the interior wall of the decoy body 6 by a bracket 53 which is placed so that when the decoy is in a substantially horizontal position the mercury switch 51 is in a slightly slanted position, so that the mercury is spaced away from the interior lead contacts of the switch 51. Thus, the mercury switch 51, and consequently the primary electrical circuit, is open when the decoy is substantially horizontal.

When the hunter pulls on pull means 17, the decoy body 6 tilts about the support rod 14 and assumes a semi-upright position. This reverses the slanted position of the mercury switch 51 and causes the mercury to flow into contact with both of the interior lead contacts of the mercury switch 51. The primary circuit will then be electrically closed and current from the battery 40 will cause the motor 33 to operate, thus turning the drive shaft 32 so as to rotate the crank arm 29. The crank arm 29 will then cause the connecting rods 25 to reciprocate back and forth and move the lever arms 24 back and forth. Thus, the wing members 19 will flap.

In order to clearly show the primary and secondary electrical circuits, Fig. 5 shows the sequence of electrical connection of the various components heretofore described of both those circuits in their relationship to one another. Of course, such components can be arranged in other ways to accomplish the same results, but this arrangement has been found to be an advantageous one.

As described above, the primary electrical circuit will be closed by the mercury switch 51 and the wing members 19 will flap whenever the decoy is tilted by pulling on the pull means 17. However, when the tension on the pull means 17 is released and the decoy returns to a substantially horizontal position, thus opening the primary circuit, the wing members 19 might occasionally be left by chance in an outstretched or open position. While this can be remedied by tilting the decoy again by pull means 17 so as to cause the wing member 19 to close against the sides of the decoy, it has been found easier and more advantageous to provide the secondary circuit to perform this function automatically.

The secondary circuit is electrically opened and closed by the cam 35 striking and then releasing the spring 36 once at each revolution of the motor drive shaft 32. The cam 35 is attached to the drive shaft 32 in such a position that its eccentric portion strikes the spring 36 and breaks the secondary circuit, thus stopping the motor only when the wing members 19 are in rest position against the sides of the decoy. Therefore, if the wing members 19 should happen to be left in an open or outstretched position when the tension on the pull means 17 is released and the decoy returns to a substantially horizontal position, the secondary circuit will remain electrically closed and the motor 33 will operate until the wing members return to rest position against the sides of the decoy, at which time the cam 35 will strike the spring 36 and break the secondary circuit and stop the motor 33.

While the most advantageous known form of this invention has been illustrated in the drawings and described herein, it is to be understood that such is merely by way of example and that other forms, modifications and embodiments may be designed within the scope of the invention as defined in the appended claims.

Having thus described my invention, I claim:

1. A fowl decoy adapted to assume a partially erect position and flap its wings comprising a support, a decoy body tiltably mounted thereon, a pair of wing members each pivotally connected to said body, lever means connected to each of said wing members, an electric motor, reciprocating means connected between said lever means and the drive shaft of said motor, an electric current source, and a position-actuated switch electrically connected in a circuit with said motor and said current source and attached to said decoy body at an angle keeping said switch open when said body is in a substantially horizontal position, said switch having a movable contact element that tilting of said decoy body from a substantially horizontal position moves to close said switch and circuit, thereby actuating said motor and operating said reciprocating means and said lever means to flap said wing members.

2. A fowl decoy adapted to assume a partially erect position and flap its wings comprising a support, a decoy body tiltably mounted thereon, a pair of wing members each pivotally connected to said body, a pair of lever arms each connected to one of said wing members, an electric motor, a crank arm connected to the shaft of said motor, a pair of connecting rods each connected at one end to one of said lever arms and connected at their other ends to said crank arm, a battery, and a mercury switch electrically connected in a circuit with said motor and said battery, said mercury switch being mounted so that said circuit is open when said decoy body is in a substantially horizontal position and is closed when said decoy body is tilted, thereby actuating said motor and operating said crank arm and connecting rods and said lever arms to flap said wing members.

3. A fowl decoy adapted to assume a partially erect position and flap its wings comprising a support, a decoy body tiltably mounted thereon, a pair of wing members each pivotally connected to said body, lever means connected to each of said wing members, an electric motor, reciprocating means connected between said lever means and the drive shaft of said motor, an electric current source, a primary circuit comprising a position actuated switch electrically connected with said motor and said current source and attached to said decoy body at an angle keeping said switch open when said body is in a substantially horizontal position, said switch having a movable contact element that tilting of said decoy body from a substantially horizontal position moves to close said switch and primary circuit, and a secondary circuit electrically parallel to said primary circuit, said secondary circuit being closed when said wing members are raised and open when said wing members are in a rest position against the sides of said decoy body.

4. A fowl decoy adapted to assume a partially erect position and flap its wings comprising a support, a decoy body tiltably mounted thereon, a pair of wing members each pivotally connected to said body, lever means connected to each of said wing members, an electric motor, reciprocating means connected between said lever means and the drive shaft of said motor, an electric current source, a position-actuated switch electrically connected in a primary circuit with said motor and said current source and attached to said decoy body at an angle keeping said switch open when said body is in a substantially horizontal position, said switch having a movable contact element that tilting of said decoy body from a substantially horizontal position moves to close said switch and primary circuit, a cam attached to and rotating with the drive shaft of said motor, a spring switch having a flexible contact member in tension contact with a stationary contact and being electrically connected in a secondary circuit with said motor and said current source, said secondary circuit being electrically parallel to said primary circuit, said spring switch being mounted adjacent to and adapted to be opened and closed by said cam, said secondary circuit being closed when said wing members are raised and open when said wing members are in rest position against the sides of said decoy body.

5. A fowl decoy adapted to assume a partially erect position and flap its wings comprising a support, a decoy body tiltably mounted thereon, a pair of wing members each pivotally connected to said body, a pair of lever arms each connected to one of said wing members, an electric motor, a crank arm connected to the shaft of said motor, a pair of connecting rods each connected at one end to one of said lever arms and connected at their other ends to said crank arm, a battery, a mercury switch electrically connected in a primary circuit with said motor and said battery, said mercury switch being mounted so that said primary circuit is open when said decoy body is in a substantially horizontal position and is closed when said decoy body is tilted, a cam attached to and rotating with the drive shaft of said motor, a spring switch having a flexible contact member in tension contact with a stationary contact and being electrically connected in a secondary circuit with said motor and said battery, said secondary circuit being electrically parallel to said primary circuit, said spring switch being mounted adjacent to and adapted to be opened and closed by said cam, said secondary circuit being open when said wing members are raised and closed when said wing members are in rest position against the sides of said decoy body.

References Cited in the file of this patent

UNITED STATES PATENTS

| | | |
|---|---|---|
| 2,013,709 | Boissoneau | Sept. 10, 1935 |
| 2,480,390 | Thompson | Aug. 30, 1949 |
| 2,576,209 | Berger | Nov. 27, 1951 |
| 2,598,471 | Waite | May 27, 1952 |
| 2,691,233 | Richardson | Oct. 12, 1954 |

FOREIGN PATENTS

| | | |
|---|---|---|
| 608,315 | Great Britain | Sept. 14, 1948 |